United States Patent [19]
Holman

[11] Patent Number: 5,285,278
[45] Date of Patent: Feb. 8, 1994

[54] ELECTRONIC REDEEMABLE COUPON SYSTEM VIA TELEVISION

[76] Inventor: Michael J. Holman, 45 Ranch View Rd., Rolling Hills Estates, Calif. 90274

[21] Appl. No.: 887,450

[22] Filed: May 21, 1992

[51] Int. Cl.⁵ .............................................. H04N 7/08
[52] U.S. Cl. ....................................... 358/142; 348/9; 348/42; 348/3; 348/5; 348/465; 348/586
[58] Field of Search .................... 358/84, 86, 141, 146, 358/93, 142, 183; 455/2; 340/721; H04N 7/08, 7/14

[56] References Cited

U.S. PATENT DOCUMENTS

| | | | |
|---|---|---|---|
| 3,848,082 | 11/1974 | Summers | 340/721 X |
| 4,999,617 | 3/1991 | Uemura et al. | 358/142 X |
| 5,014,125 | 5/1991 | Polock et al. | 358/86 |
| 5,034,807 | 7/1991 | Von Kohorn | 358/84 |
| 5,057,915 | 10/1991 | Von Kohorn | 358/84 |
| 5,070,404 | 12/1991 | Bullock et al. | 358/146 X |
| 5,128,752 | 7/1992 | Von Kohorn | 455/2 X |

Primary Examiner—Mark R. Powell
Attorney, Agent, or Firm—Ladas & Parry

[57] ABSTRACT

An electronic redeemable coupon generating system which comprises an encoder for encoding coupon-related data in a television signal transmission, the transmission including picture information for display on a television monitor screen; a decoder for receiving the television signal transmission and extracting the coupon-related data therefrom; and a recording device for recording the extracted coupon-related data on a recording medium for subsequent readout and redemption. In a preferred embodiment of the invention, the decoder includes a display driver for displaying indicia on a television monitor screen responsive to coupon-related data being encoded in the television signal transmission. Upon observing the indicia on the television monitor screen, the user can manually and selectively extract the coupon-related data from the television signal transmission. After an optional editing function, the extracted coupon-related data is stored on a recording medium such as a magnetically striped card.

37 Claims, 6 Drawing Sheets

ELECTRONIC REDEEMABLE COUPON SYSTEM VIA TELEVISION

CROSS-REFERENCED TO RELATED APPLICATIONS

Applicant is the owner of prior filed U.S. patent application No. 07/849,224 filed Mar. 10, 1992.

BACKGROUND OF THE INVENTION

1. Field of the Invention

This invention relates to redeemable coupons, and more particularly to a system for generating electronic redeemable coupons. Coupon-related data is encoded in a television signal transmission and decoded in a home unit for later redemption by the user.

2. Brief Description of the Prior Art

The use of redeemable coupons is very old. For decades advertisers have issued or published printed coupons which can be taken to a redemption center, such as a retail store, and redeemed for some value or as a discount toward the purchase of some item. While this method has proven to be effective, there are many disadvantages to the process for the user, for the redemption center or retail store, as well as for the advertisers themselves.

The problems associated with clipping coupons by a user are manifold. First, a user must purchase or otherwise obtain a publication and search through such publication for coupons which would be meaningful or useful to the user. The user then must cut out such coupons, being of various physical sizes, leaving a pile of scrap paper and holes in the pages of the publication. Some advertisers use handouts or flyers which make the searching job easier, but there is still the problem of cutting out the coupons which is annoying and a waste of valuable time. Being of different sizes and pertaining to different types of products, the user must separate the coupons into product categories and band the coupons together as best as he or she can. The user then stuffs these sorted coupons into a pocket or purse and is off to the market. Upon arrival at a particular retail outlet at which at least some of the coupons are redeemable, the user usually fumbles through the groups of coupons and attempts to find the products in the store, and if they are not familiar with the layout of the store, this could again constitute a gross misuse of valuable time. Furthermore, since each store lays out their products differently, in order to redeem some coupons, the user may find it necessary to search out the desirable item in a number of stores. Finally, upon gathering the product into the pushcart, the user has yet another manipulation to make, i.e. he or she must select the coupons for which the products have been purchased from a number of coupons the user brought to the store initially.

This then leads to the next problem associated with coupon redemption, in that the store clerk must sort through the coupons, ensuring that they relate to the products being purchased and that the expiration dates are appropriate, and then enter the discount information in the computer (modernly, by a bar code scanner). This part of the redemption process takes valuable time away from the checkout clerk and irritates other people waiting in the checkout line. After the customer leaves, the retail store is still not relieved from further expenditure of valuable employee time, since the accumulated coupons in the retail store must now be sorted by manufacturer, tallied on a score sheet or in a computer or submitted to a brokerage house, and sent off to the manufacturer for retail store reimbursement.

Insofar as the manufacturer of the product is concerned, while there is direct evidence that people are reading their ads and using coupons, and although the number of coupons coming back to the manufacturer indicates some level of success in advertising, there is very little additional marketing information that can be derived from this type of coupon redemption scheme. Furthermore, any information the manufacturer does obtain is old information, the total processing of a coupon from publication to reimbursement to the retail stores taking perhaps several weeks. Additionally, the manufacturer has no information whatsoever about the nature of the customer, their age, sex, occupation, family environment, place of residence, or other information which would be of great value to the manufacturer in planning future advertising programs. Since each coupon is submitted anonymously, the manufacturer has no idea of how to reach that person again for arousing interest in related products. While some demographic information can be obtained by noting the geographical regions in which the coupons were redeemed, the lack of any specific information as to the nature of the purchaser leads many manufacturers to conduct separate marketing surveys which are extremely costly and time consuming. Some manufacturers are known to have spent millions of dollars to gather such information.

The television industry, contrasted to the printed media industry, is unable to offer its viewers (potential customers) any coupons which can be taken to the retail store for redemption. The best that an advertiser can do in television is to simply make the public aware of a sale on a particular item or line of items produced by a certain manufacturer. In some instances, telephone numbers and/or addresses are given to the viewing public, and if the viewer wishes to use up a lot of valuable time, he or she can make the telephone call and/or write the letter to gain access to additional information and perhaps coupons which can be redeemed for products or discounts on products. Again, however, the general public is generally not willing to make the extra effort to jot down a telephone number and make a call which likely would end up in a "sales job" from the person at the other end of the line, and would, to an even greater extent, resist the suggestion to write a letter to the manufacturer for product and discount pricing information, assuming that a pencil and paper is ,always at hand and that the name and address to which the viewer is to write is presented on the screen long enough to copy it down.

It can therefore be appreciated that there are many problems associated with existing coupon redemption programs, and the drawbacks of these systems are numerous and disliked by all three entities involved, the consumer, the redemption center (retail outlet store), and the manufacturer. There is therefore a great need for a redeemable coupon system which would: (1) significantly decrease the amount of time and effort a consumer expends in locating, clipping, and assembling the coupons; (2) give the consumer guidance at the redemption center as to the availability of the product to which the coupon pertains and the location in the store of that product; (3) enable the redemption center to more quickly and automatically credit the coupon amounts against the products being purchased and reduce the time and effort in organizing and reporting the coupons which have been redeemed; (4) enable the manufacturer to get quick results in the amount of usage of the coupons, the demographics of usage, and detailed information about the consumer including name, address, interests, and other data which would permit the manufacturer to access the value of the coupon distributing effort and to make and/or modify future plans for additional advertising or sale; and (5) establish firm controls over excessive or non-intended use of coupons. The present invention fulfills these various needs.

SUMMARY OF THE INVENTION

The present invention overcomes the deficiencies and disadvantages of current coupon redemption programs outlined above by providing an electronic redeemable coupon generating system which comprises an encoding means for encoding coupon-related data in a television signal transmission, the transmission including picture information for display on a television monitor screen; decoding means for receiving the television signal transmission including means for extracting the coupon-related data therefrom; and recording means for recording the extracted coupon-related data on a recording medium for subsequent readout and redemption.

In a preferred embodiment of the invention, the decoding means includes means for displaying indicia on a television monitor screen responsive to coupon-related data being encoded in the television signal transmission. Upon observing the indicia on the television monitor screen, the user can manually and selectively enable and disable extraction of the coupon-related data from the television signal transmission.

The selectively extracted coupon-related data is then accumulated in a memory means within the decoding means, and after an optional editing function, the extracted coupon-related data is stored on a recording medium. In a preferred embodiment of the invention, the recording means is a magnetic card writer and the medium is a magnetically striped card.

In another aspect of the invention, there is provided a decoding unit for receiving a television signal transmission containing picture information for display on a television monitor screen and also containing encoded coupon-related data, the decoding unit comprising means for extracting the coupon-related data from the television signal transmission, and recording means for recording the extracted coupon-related data on a recording medium for subsequent readout and redemption. The decoding unit may be a stand-alone unit or incorporated within the electronics of a "cable box".

After the electronic coupon is redeemed at the redemption center, additional apparatus at the redemption center is configured to assemble and printout reports of coupon redemption activity for each manufacturer. However, after being entered electronically, the information is sorted and reports are generated automatically by the operation of the redemption center's computer. The operation of the computer apparatus at the redemption center is not unlike the configuration and functioning of any other data base computer system, the only difference being the type of information being manipulated.

In a sophisticated redemption center apparatus configuration, means can be provided for reading the stored electronic coupon data from the user's magnetic card by having the user wipe the card through a magnetic card reader at the cash register, and the discounts would be applied automatically to the products being purchased. The sales slip would reflect the original price, the discount, and the net amount owed by the customer in an almost instantaneous fashion. Optionally the redemption center can have an electronic coupon desk where a user can wipe his or her card in a card reader and have a display or printout of the availability and location in the store of the product of interest. If printed out, the coupons or coupon list can be presorted so that the purchaser will be guided through the store aisles in an orderly fashion as the different items are gathered in.

BRIEF DESCRIPTION OF THE DRAWING

The invention will now be described in more detail having reference to the accompanying drawings in which.

DETAILED DESCRIPTION OF THE PREFERRED EMBODIMENTS

Figure 1:
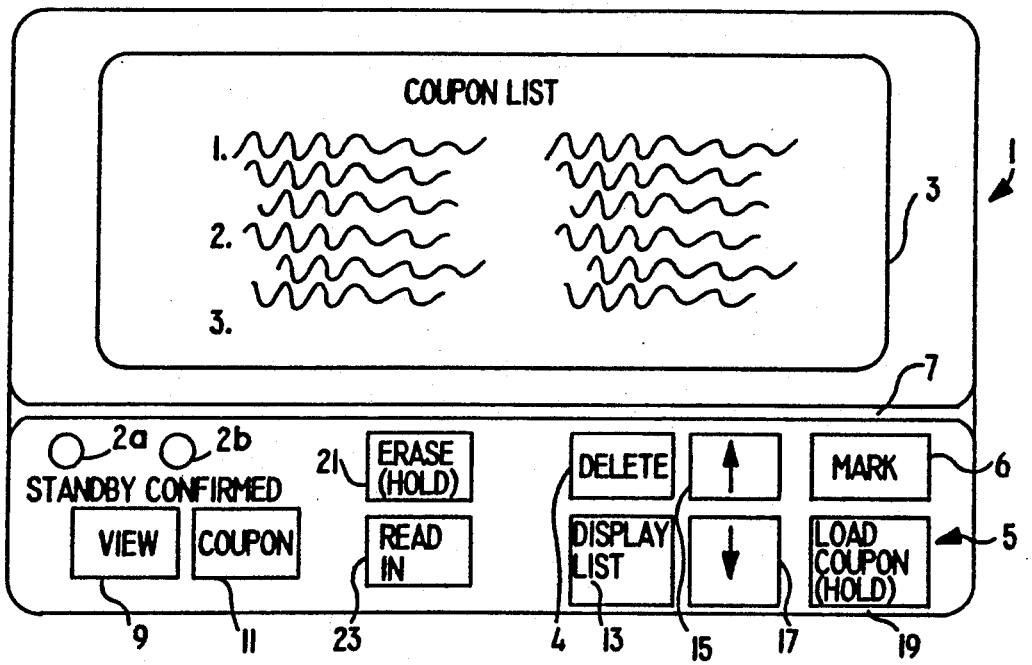
FIG. 1 shows the front face of a home unit which functions as a decoder for extracting coupon-related data from a television signal transmission.

A home unit 1 is shown in FIG. 1 in the form of a small box which could be placed on the top of a television receiver or other convenient location. The home unit 1 can optionally have a display screen 3 and a series of operating buttons 5. In a preferred embodiment of the invention, a magnetic card (hereinafter referred to as magcard) slot 7 receives a magcard (not shown) for writing or reading purposes. It is to be understood that other mediums could be used, such as optical cards and microelectronic (microchip) circuit cards.

FIG. 1 is only one example of a home unit, and many variations are possible. For example, all of the electronics of the home unit can be hidden from view with the exception of an infrared sensor to receive a command from a remote control device. The magnetic card writer/reader with slot 7 can be a totally separate unit so as to occupy as little space as possible on the top of a television set. For example, the magcard writer/reader could be stuck to the side of a television receiver by means of doublebacked foam tape. Some functions, however, might be more user friendly with a home unit such as that shown in FIG. 1 which could duplicate any of the functions controllable by the remote control device.

The operation of the home unit would typically be as follows. In describing this function, reference is also made to the block diagram of FIG. 2 which shows a basic overall arrangement of the home unit having various coupling arrangements with a cable box 33, a VCR 35, a television receiver/monitor 39, a printer 41, and a remote control device 43.

During the presentation of a television commercial, a logo or emblem 40 is seem in the upper right hand corner of the TV screen 38. If the viewer is interested in the product that is the subject of the commercial, the user pushes the VIEW button 9, and a message 8 is instantly decoded from the television signal transmission and displayed along the bottom of screen 38. The message can inform the viewer that the manufacturer or sponsor of the commercial has available an electronic coupon to be redeemed. For example, the message 8 might read "$1 discount on 6-pack of Coke ®". If the user wishes to take advantage of this offer, the COUPON button 11 is pressed, and coupon-related data is entered into an internal memory of the home unit 1. A confirmation signal is generated upon successful memorization of a selected electronic coupon which alters an attribute of the logo as a visual indicator of the confirmation. For example, a color in the logo will change upon confirmation. The viewer continues to push the VIEW button 9 each time a logo or emblem 40 is observed and the viewer is interested in the commercial product. Likewise, each time the viewer is interested in redeeming the coupon offer made in the message 8, the COUPON button 11 is pressed to store all selected coupon-related data for each commercial in the internal memory of home unit 1.

When the viewer wishes to redeem the electronically stored coupons, the DISPLAY LIST button 13 is depressed. This immediately puts onto the screen 38 or to the local display 3 of the home unit 1 itself, a coupon list which shows all of the accumulated electronic coupons selected by the viewer by the procedure just described. Since the list may be long and include items which the viewer may no longer interested in, an editing function is provided. The UP ARROW button 15 and DOWN ARROW button 17 are used, as with any computer keyboard, to move a cursor through and scroll the coupon list. For any listed coupons in which the viewer is no longer interested, the "DELETE" button 4 is pressed. This will instantly delete the coupon at the cursor position from the list (or from the item category discussed below). The viewer then pushes the MARK button 6 for each coupon of current interest in the list. After being satisfied that the list includes all the electronic coupons which the viewer wishes to redeem, the LOAD COUPON button 19 is pressed while a magcard (not shown) is wiped through slot 7. This will transfer the marked coupons to the magcard for redemption.

Figure 5:
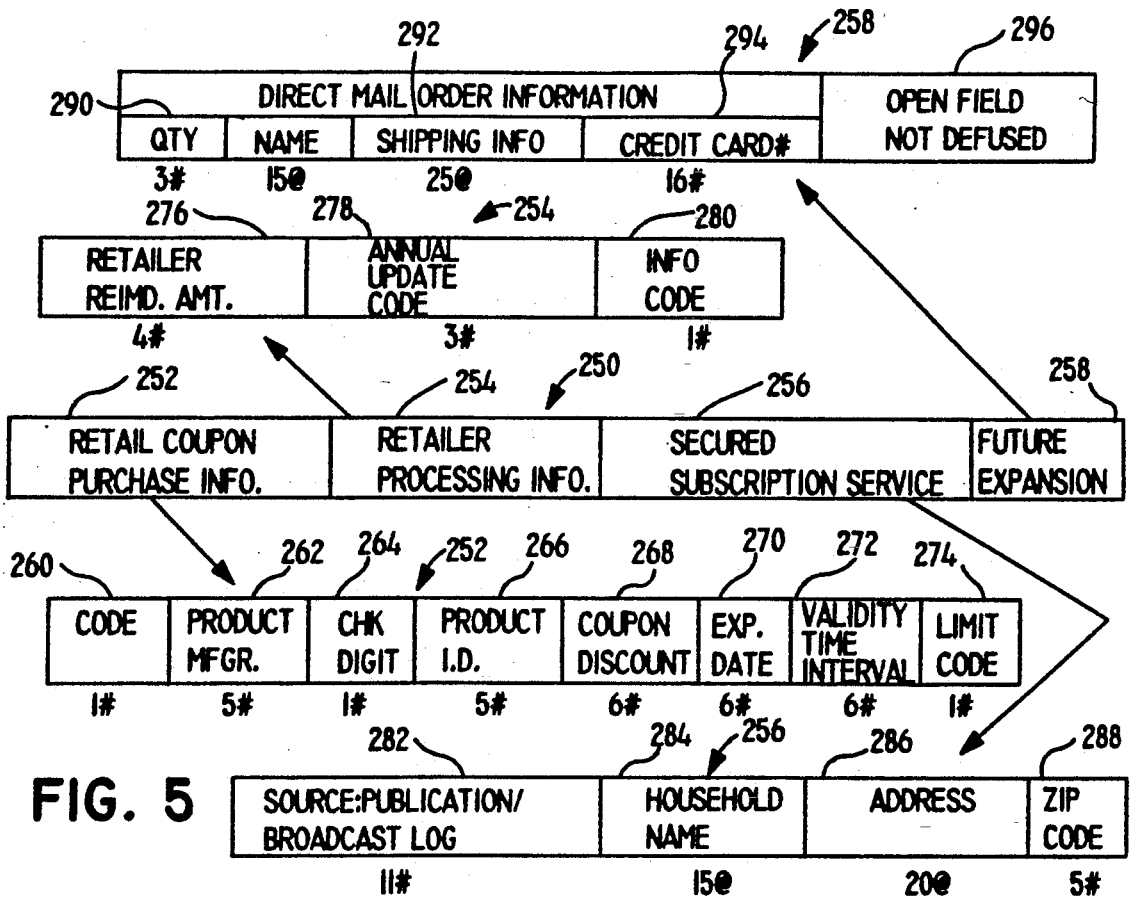
FIG. 5 is a representation of the arrangement of bytes comprising the separate fields of the encoded coupon message.

Looking ahead at the coupon-related data to be stored in the memory of home unit FIG. 5 shows a one character code byte 260 which is part of the retail coupon purchase information identifying the product. Each product type will have a different code number. For example, grocery items may be code 1, hardware items code 2, automobile items code 3, home improvement items code 4, and so on. One of the convenient features of the present invention is the automatic sorting of inputted coupon-related data, similar to the operation of a pocket telephone number data base wherein the names associated with each telephone number are sorted in alphabetical order automatically upon entry. When the viewer is thus presented with the list of redeemable electronic coupons, the coupons will be presorted automatically into separate categories of items, with grocery items being listed first, hardware items second, etc. The viewer can further assist in the convenient use of electronic coupons by uniquely marking individual magnetic cards, or choosing different colors for them so that each marked card will be used to store the same type coupon. For example, the card for grocery items may be colored blue, hardware items green, automobile items red, and so on. Since the items on the TV screen will already be grouped in categories, it will be relatively easy to place a mark beside the selected items, or group of items, in any particular category and, using the LOAD COUPON button 19, record on the respective colored card only the items in that category. The next colored card is then selected and the user scrolls through the next grouping on the list of redeemable coupons and makes the choices as before for this new category. Since most television sets have color screens, it is a relatively simple matter to go one step further in the presentation of the list of electronic coupons by presenting the particular category of coupons on the screen in colors corresponding to colored cards to be used to store the coupons selected from that category. The electronics for carrying out this function are not described in this specification.

Since the viewer may have several magcards which contain data that is no longer valid, an ERASE button 21 is provided. The viewer merely holds the ERASE button 21 down while wiping the card through slot 7, and the appropriate magnetic strip on the card is erased. Both the ERASE button 21 and LOAD COUPON button 19 must be held down while wiping the card through slot 7. This is a safety feature which will eliminate the possibility of accidentally recording over or erasing a card if either of these two functions were to remain active upon pushing and releasing their respective buttons.

When either the LOAD COUPON or ERASE buttons 19 or 21 are pressed, it is important for the user to know whether or not the information has been successfully transferred to the magcard. In accordance with known circuitry, when either button 19 or 21 is pressed, a green "standby" light 2a will illuminate. When the card is wiped through slot 7, if it has been read correctly and verified by known digital comparison techniques, a red "confirm" light 2b will be lit. Preferably, the indicators 2a and 2b are LED indicators.

Finally, as will be learned later, the viewer/user may redeem certain electronic coupons at a retail store and not others. He or she thus returns home with some unused electronic coupons on the magcard. Provisions are thus made to retrieve unused electronic coupons back into the memory of the home unit 1 by pushing the READ IN button 23 and wiping the card through slot 7, to eliminate the accumulation of numerous cards of similar categories with only remnant coupons remaining.

Figure 2:
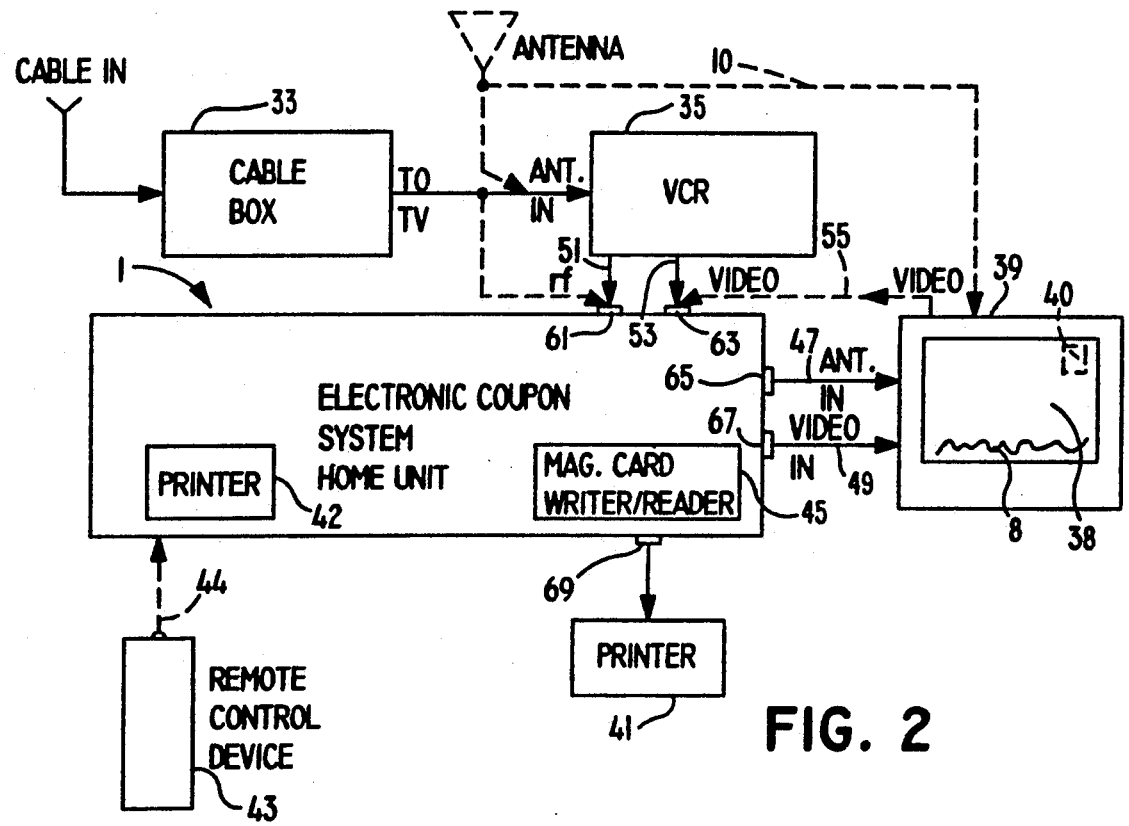
FIG. 2 illustrates possible interconnections of the home unit as it would be connected, depending upon desire of the user, with a cable box, VCR, television monitor, printer, and remote control device.

Since the electronic coupon information to be displayed as a message 8 on screen 38 is contained in the television signal transmission, various possibilities for connecting the home unit 1 with already existing components in the viewer/user's home are possible. FIG. 2 shows certain possibilities. In solid line interconnection, a cable box 33 receives the television signal from a cable system and outputs the cable-converted signal to one of the unused air-transmitted television channels as input to VCR 35. Alternatively, an antenna 10 may be routed, as shown in dotted lines to the input to VCR 35 or directly to the television receiver 39. As yet another alternative, the cable box 33 can output its rf signal to an rf input terminal 61 of home unit 1. If a VCR 35 is used, the rf output on line 51 can be substituted into the rf input terminal 61 of home unit 1. In the example of this description, it will be assumed that the rf input to terminal 61 is a television signal transmission on channel 3. In such a case, home unit 1 must have an rf-to-video converter, as will be explained in connection with FIG. 3.

More desirably, home unit 1 receives a video input on terminal 63 from line 53 of VCR 35. Of course, any other video source is equally acceptable, such as that on line 55 directly from the television receiver/monitor 39. Video in and video out terminals on television sets are becoming more popular but are not available on certain sets, especially older ones.

In order to insert the coupon-related data onto the signal being displayed on screen 38, it is necessary to pass the television signal, normally being displayed on the TV screen, through home unit 1. The message 8 is then inserted by an encoding process and routed to the television set 39. If a video input terminal is available on TV set 39, an encoded video formatted signal on line 49 is outputted at terminal 67 of home unit 1 If an rf input is to be used on television set 39, a video-to-rf converter within home unit 1 will have to be used to output a channel 3 rf signal on line 47 from output terminal 65. FIG. 2, in addition to showing a magcard writer/reader 45 (having a slot 7 as shown in FIG. 1), also shows an optional local printer 42 for direct printing of coupons to be redeemed by the viewer/user. An auxiliary output from terminal 69, however, is available for an external printer 41 or any other use, such as an optical stripe writer/reader instead of the magcard writer/reader 45.

As mentioned earlier, instead of using front panel control buttons 5 (FIG. 1), a remote control device 43, sending its commands along an infrared path 44, will be received by home unit 1, and all functions of home unit 1 will respond to such commands. Various methods and devices are available for programming remote control devices for new functions, and therefore such discussion in this description is not necessary. It is sufficient to state, however, that any mechanical button operation on the front panel of home unit 1 shown in FIG. 1 can be easily duplicated on the remote control device. Two possible exceptions are the ERASE and LOAD COUPON functions described earlier whose functions are preferably carried out only when the respective buttons 21 and 19 are held down during the wiping of the card through slot 7.

Figure 3:
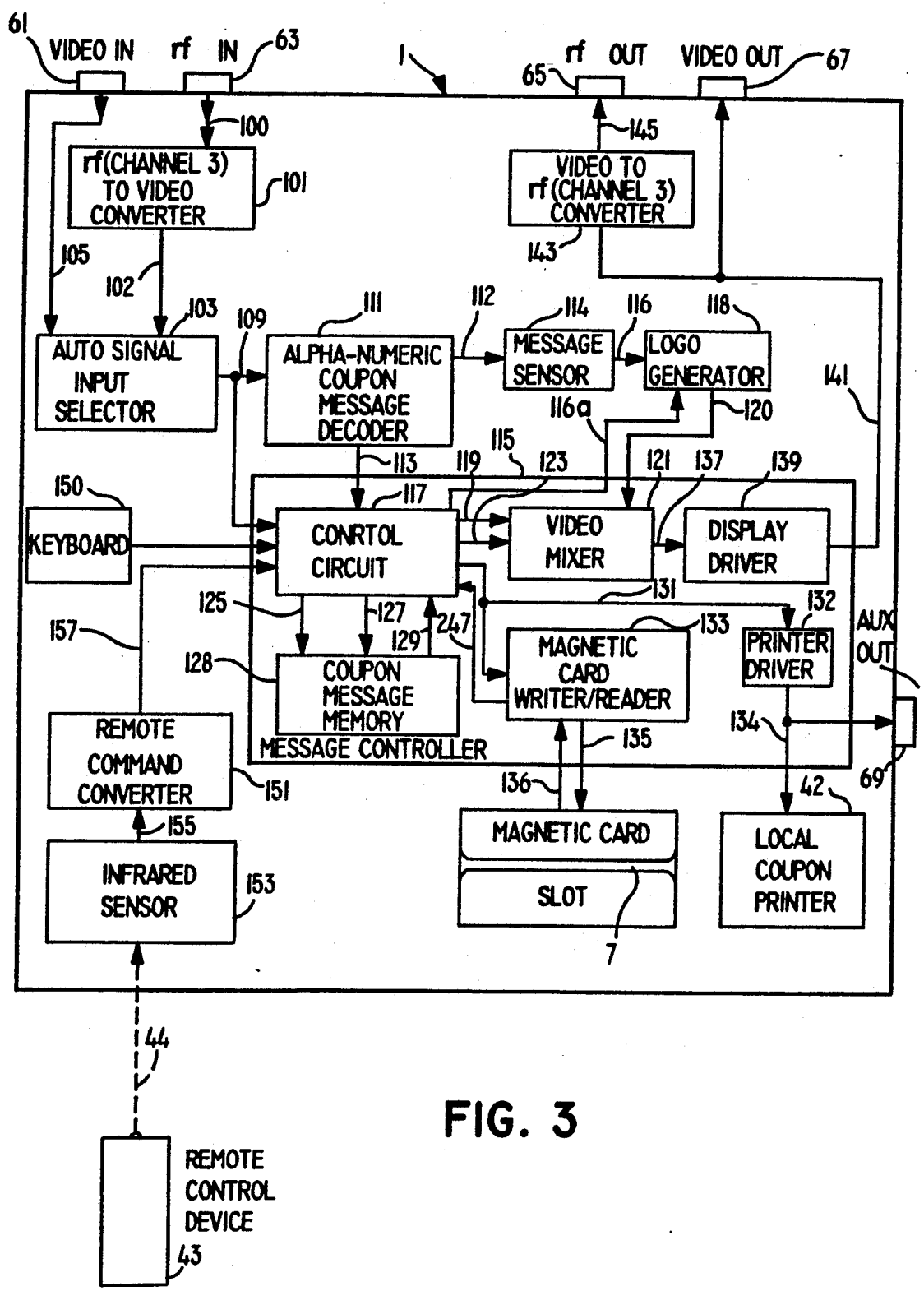
FIG. 3 is a block diagram of the internal functions of the home unit.

FIG. 3 is a block diagram of the home unit 1 depicting the circuit blocks necessary to carry out the desired functions. Each of the blocks will be described as to their specific function, and all such blocks in FIG. 3, when fully detailed in accordance with FIGS. 4, 6, and 7 and the associated description, will enable the person skilled in the art to make and use the invention by interconnecting available components to implement the functions to be described and in a manner which would be readily apparent to those skilled in the art without undue experimentation.

It will be recalled that the television signal transmission will contain coupon-related data encoded in the transmission. For a description of how this can be done, reference is made to the inventor's aforementioned prior invention entitled "ENCODER/DECODER FOR VISUAL DISPLAY OF AUDIO/VISUAL PROGRAM PARTICULARS", filed Mar. 10, 1992 under Ser. No. 07/849,224, such prior patent application being incorporated here by reference. In such prior patent application, it is suggested that certain message information can be carried in the vertical interval between horizontal sync pulses of a television signal, similar to the manner in which close-captioned message information is transmitted. Although other methods of encoding a television signal transmission are possible and could be described, the manner in which such encoding takes place is not the focus of this invention, and it will be assumed that the closed-caption type encoding process is used. Obviously, the information could also be encoded in various sub-carriers of the video/audio components of the television signal.

In any event, the function of FIG. 3 is to decode the message information from the television signal transmission, indicate the existence of the coupon-related data being transmitted to the viewer, mix the decoded coupon-related data with the normal television picture signal so as to present a superimposition of the two signals on the television screen of the viewer, and to provide various functions for manipulating the electronic coupon information, e.g. for coupon redemption.

If the input to home unit 1 is video, it is applied to terminal 61 and sent along line 105 to an automatic signal input selector 103. If the input is rf, it will be inputted into terminal 63, applied along line 100 to a conventional rf-to-video converter 101, the output of which is again a video signal also routed to selector 103. Automatic signal input selectors are known which respond to whatever input is active, so that the operation of selector 103 is understood to be known without detailed explanation. The video output on line 109 is applied both to the message controller 115 and alphanumeric coupon message decoder 111, decoder 111 extracting the message encoded in the video signal and outputting the message signal alone on line 113 as an input to control circuit 117. In this description, the term "message" will be used to designate the contents of the electronic coupon. For example, decoder 111 converts the electronic coupon information encoded in the television signal transmission to a series of digital bits grouped in bytes, a number of bytes defining the data contained in several fields, the string of fields defining the "message". Both the video (picture) input on line 109 and message input on line 113 are operated on in control circuit 117 in a manner to be discussed later, with the result that video (picture) information outputted on line 119 and message information (coupon-related data) on line 123 is mixed in video mixer 121, sent to display driver 139 over line 137, and made available at video output terminal 67 or, through a video-to-rf converter 143 to an rf output terminal 65 over line 145. A TV monitor will receive either output 65 or 67, depending upon whether an rf or video input to the TV monitor is selected. This basic signal path through message controller 115 results in a display of the message in the picture presented to the viewer, preferably superimposed at the bottom of the screen so as to permit the viewer to continue to watch the program or commercial in progress.

As indicated, a logo or emblem is to appear on the TV screen when a message is being transmitted, and toward that end, an output of decoder 111 is applied on line 112, to message sensor 114. Sensor 114 is therefore simply a threshold detector which disables logo generator 118 by a control line 116 in the absence of a message signal. However, when a message is being decoded by decoder 111, the threshold of sensor 114 is exceeded, and the output on line 116 is an enabling control signal (logical 1) to permit logo generator 118 to generate an electronic coupon logo or simple emblem with timing and synchronization so that the logo will appear in the upper right hand corner of the screen. A suggested logo, for example, would be a thin circle. The logo signal on line 120 is fed to video mixer 121 and mixed with the video picture information and message information as previously described. Thus, if a message is present in the television signal transmission, the logo will appear on the TV screen, and if not, the logo will not be visible.

A keyboard 150 represents either the buttons 5 (FIG. 1) on the home unit 1 itself, or the functions controlled by buttons on a remote control device 43. The infrared light beam 44 is sensed by infrared sensor 153 and sent as digital commands on line 155 to remote command converter 151. Converter 151 merely converts the digitized remote control button pushes to a specific "1" and "0" control signal for operating in parallel with or in substitution for the ON/OFF mechanical buttons of the keyboard 150. By such control, messages are selectively stored by command of the control circuit 117 passing the extracted message on line 125 to coupon message memory 128. As confirmation to the user that a coupon message has been successfully stored, control unit 117 sends a confirm signal back to logo generator 118 on line 116a which changes an attribute of the logo, e.g. it may change to a solid filled circle, or it may change color.

An editing function in control circuit 117, to be discussed later, can erase any stored coupon by action on line 127 and can retrieve stored messages from memory 128 on line 129.

After the accumulated messages in coupon message memory 128 are properly edited, they are outputted over line 131 to a magnetic card writer/reader 133 and printer driver 132. Although not the preferred embodiment of the invention, the output of driver 132 is available as an auxiliary output at terminal 69, or is sent along line 134 to a local coupon printer 42 which is physical located on the home unit 1, similar to the manner in which the tape printer in a hand-held calculator is mounted. In this way, the selected coupon messages can be printed out for redemption at a retail outlet similar to the way cut-out coupons are redeemed prior to the present invention. There are advantages, however, in using coupons printed by the home unit. One advantage is that, along with the stated amount of discount for a particular product, the standard bar code for that product is also printed on the coupon. When the coupon is taken to the store for redemption, an optical reader at the store will scan the bar code and make available valuable information to the customer, such as whether or not the product is in stock and the aisle location in the store. While cut-out coupons have bar codes, there is an opportunity to include other information useful to the store owner and/or product manufacturer, such as personal data on the coupon user and the details of the television program being viewed when the coupon offer was selected.

In the preferred embodiment of the invention, the accumulated coupon messages in memory 128, upon command by the viewer/user will be outputted over line 131 to a magcard writer/reader 133 and written onto a magnetic card wiped through slot 7 receiving its input from writer/reader 133 on line 135.

As earlier explained, if information is to be transferred from the magcard back to the home unit 1, this is accomplished by wiping the card through slot 7 resulting in a signal on line 136 to the reader portion of writer/reader 133. The recovered message information is then passed over line 247 back to control circuit 117 for insertion into the memory 128 along with the other accumulated messages there.

Figure 4:
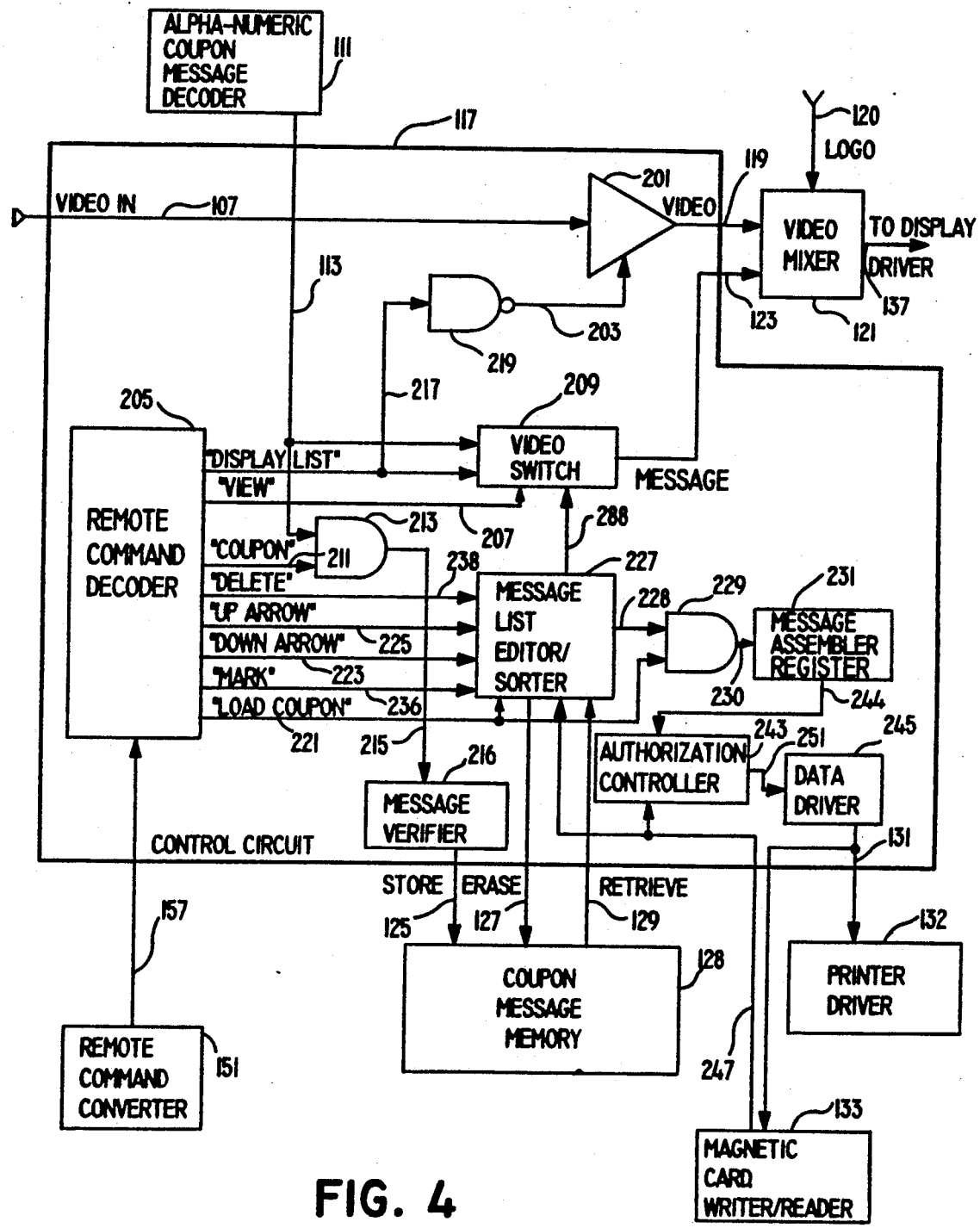
FIG. 4 is a more detailed block diagram of the control circuit shown in FIG. 3.

FIG. 4 is a more detailed block diagram of the control circuit 117 shown in FIG. 3. Recalling the need for passing the video signal through the home unit 1 for insertion of the logo and message, the video input on line 107 is passed through a video amplifier 201 and onto mixer 121 into which the logo signal on line 120 and the message on line 123 are inputted. The mixed output is sent to display driver 137 for ultimate display on TV monitor 39.

In this discussion, as opposed to operating a number of buttons on the home unit 1 itself, it will be presumed that the operation of control circuit 117 is by way of the remote control device 43 which produces a number of commands from converter 151 and decoded into separate command lines in remote command decoder 205 in a conventional manner. This decoder 205 simply creates a digital "1" or "0" signal on the appropriate output line in correspondence with the unique digital code generated by pushing corresponding buttons on the remote control device 43. Such processing of information from by remote control unit into separate command lines is a well-known technique.

It will be recalled that the first step in the process of storing a desired message is to recognize that the message is being transmitted and to insert a logo on the TV screen. Alpha-numeric coupon message decoder 111 continually receives the video input signal which may or may not contain a message. However, if one exists at all, it will be passed on line 113 to video switch 209 and AND gate 213. Since the viewer does not want to see every message that comes along, the message signal is sent to video switch 209 for control by the user. On the other hand, in FIG. 3 it was learned that when a message is present, a logo is generated in the upper right hand corner of the TV screen. Preferably, the logo is not switchable to an OFF state. When the viewer sees that logo, the "VIEW" command enables video switch 209 to pass the message on line 123 to video mixer 121.

The "VIEW" command on line 207 will always pass the message through to be observed on the TV screen. However, in the absence of a "VIEW" command, video switch 209 will be turned off and no message transmitted through to the TV monitor. Thus, while the logo will appear for each and every electronic coupon message being transmitted, the message at the bottom of the screen will appear only at the user's discretion, i.e. if the "VIEW" command is given. The logo will intentionally be small enough so as to not disturb the viewer from enjoying the picture presentation. It should be realized moreover, that such logo will appear only during commercial presentations in any event.

The viewer will not want to accumulate every available electronic coupon in memory 128 for a variety of reasons. First, the viewer will not be interested in purchasing each and every product for each logo appears. Secondly, the memory 128 will, of course, have reasonable storage capacity limitations. Thus, a message is not to be stored in memory 128 until the user selectively issues the "COUPON" command. This command, on line 211, opens AND gate 213 and passes the message signal on line 215 to a message verifier 216 which simply ensures that the asynchronous signal being received is digitally valid, at which time it sends the complete message on line 125 to be stored in memory 128. The viewer then has another opportunity, at seeing the next logo, to select or not the message for storage in memory 128 by again issuing the "COUPON" command. Memory 128 thus accumulates a number of messages representing stored electronic coupons.

At any time the viewer wishes, a review of the stored messages can be made. All that is necessary is for the viewer to issue the "DISPLAY LIST" command. This command has two basic functions. First, over line 217, it is inverted logically by NAND gate 219 so that a "DISPLAY LIST" command turns off video amplifier 201 by control line 203. The picture content of the video program is thus interrupted and a blank screen, or solid colored screen, would appear on the TV monitor. At the same time, the "DISPLAY LIST" command switches to the output of video switch 209 the input on line 288 from a message list editor 227 which continually sorts and monitors all of the messages in memory 128 on retrieval line 129. Thus, at any time video switch 209 selects its input on line 288, the entire list of messages in memory 128 will be presented on the TV screen sorted by a code and product manufacturer identification using fields 260 and 262 in the message data bytes of each electronic coupon, as will be discussed in connection with FIG. 5. In this case, the entire screen, not just the bottom thereof, will contain information, being the entire list of electronic coupons stored in memory 128. The reason for interrupting the video programming picture by disabling amplifier 201 is to permit easy viewing and editing of the electronic coupon listing without a disturbing moving picture in the background. The viewer would obviously want to concentrate on the electronic coupon listing without distraction, and would do so when the viewer is not interested in the picture presentation (e.g. late at night, just before going on a shopping trip, etc.).

Since the accumulated electronic coupons may be more than the TV screen can display at one time, the viewer can issue an "UP ARROW" or "DOWN ARROW" command on lines 225 and 223 respectively to scroll through the stored electronic coupon menu. Since it is also desirable to discard electronic coupons no longer of interest or which were tentative in the first place, an editing function is provided in control circuit 117.

With the "DISPLAY LIST" command issued, the viewer can scroll through the coupon menu and issue a "DELETE" command on line 238 which immediately removes the identified coupon message from memory. Whether or not a "DELETE" command is issued, the viewer may issue a "MARK" command on line 236 which inserts a flag into those messages on the menu which the user wishes to keep while the cursor is scrolling through the coupon menu. This is a convenience feature whereby the user may not want to write all of the coupons to the magcard, for example if the user wants to shop at one grocery store for some items now and at another grocery store for other items later. After the viewer is satisfied that all of the marked electronic coupons are those he or she wishes to redeem, the "LOAD COUPON" command is issued on line 221. Prior to issuance of the "LOAD COUPON" command, AND gate 229 as disabled by the low logic level of line 221. Thus, the continually recycled messages in memory 128, available on line 228 does not pass through AND gate 229. However, after marking, the "LOAD COUPON" command erases all of the flagged messages in memory 128 over erase line 127 by action of the message list editor 227 responding thereto, and enables gate 229, passing the edited electronic coupon listing over line 230 to a message assembler 231 which serves as a holding register for the edited coupon list. The coupon list is passed through authorization controller 243 and on to data driver 245 for outputting on line 131 to either a printer driver 132 or the magnetic card writer 133. In this manner, the contents of a magcard is only those electronic coupons which the viewer wishes to redeem.

Another feature of the invention involves an automatic validation function which checks to see if any given message which the viewer wishes to store is valid and "authorized", before the user issues the "LOAD COUPON" command. There are several reasons why it would not be advisable to either permit storage of a particular electronic coupon or to permit it to remain in memory 128. The obvious reason is that certain coupons are intended to expire after a certain date. One of the functions of the home unit 1 is to automatically delete those coupons which have expired from the coupon menu listing. Another reason for limiting the contents of memory 128 is that a manufacturer may wish to honor a discount coupon only a limited number of times per family, or a single discount now and a predetermined time to pass before the discount would be good by the same user. Otherwise, the manufacturer may have a flood of discount coupons generated by a single user who distributes the coupons in printed form or on magnetic cards to all of his friends or neighbors at will.

Another reason for disqualifying the storage and usage of electronic coupons is that a user of the electronic coupon system may be required to reinitialize or update the system by means of a simple regular, perhaps yearly, maintenance procedure. Each user, for example, may be considered a subscriber to the electronic coupon service, and if there is reason to discontinue a user's subscription, such user should be precluded from using the system. The updating will ensure that the household information retained in the system is kept current.

Authorization controller 243 is provided to serve those functions. It receives the message list from message assembler 231 and enters information from a subscription card (to be discussed later) on line 247 from the magcard reader 133. Controller 243 then automatically permits passage of, or not, the contents of register 231 in accordance with the block diagram of FIG. 6.

Having reference back to FIG. 4, the object of the authorization controller 243 is to selectively restrict electronic coupons from being recorded on a magcard by magnetic card writer/reader 133 under certain conditions, and to add or update household information which identifies the user/owner of the magcard. Toward this end, the output from message assembler 231, representing the digital form of the assembled (edited) list of electronic coupons, is passed over line 244 to authorization controller 243. Household information is received by controller 243 over line 247 from the magcard reader. If there are no restrictions on the use of any particular electronic coupon, controller 243 passes the digitized electronic coupon over line 251 to data driver 245. Driver 245 is simply a buffer to send data to printer driver 132 and magnetic card writer 133.

FIG. 5 shows one arrangement of data bytes in a complete message representing an electronic coupon. The complete message is shown at 250 comprising four sections: a RETAIL COUPON PURCHASE INFORMATION portion 252; a RETAILER PROCESSING INFORMATION portion 254; a SECURED SUBSCRIPTION SERVICE portion 256; and a FUTURE EXPANSION portion 258. These four portions are also shown broken down into their smaller components in FIG. 5. For the purposes of disclosing the basic invention, only the first three sections are discussed in detail herein and implemented by specific circuit blocks in the drawing.

For example, portion 252 contains information about the product being purchased or upon which the discount is to be applied, and has the following sections CODE 260 (1 byte), PRODUCT MANUFACTURER 262 (5 bytes), CHECK DIGIT 264 (1 byte), PRODUCT IDENTIFICATION 266 (5 bytes), COUPON DISCOUNT AMOUNT 268 (6 bytes), EXPIRATION DATE 270 (6 bytes), VALIDITY TIME INTERVAL 272 (6 bytes) and LIMIT CODE 274 (1 byte).

The card to be used with the invention is based on the current ADA standards (210 bits per inch, per track) of magnetic card technology using an older standard 4-track per strip system, with a maximum of four strips per card. There are approximately 2,750 data bits per magnetic tape strip×4 strips maximum per card, or 11,000 bytes per card. In certain fields of information, such as that in RETAIL COUPON PURCHASE INFORMATION portion 252, only numerical information is necessary. In these fields, five bits per character would be required resulting in 2,750/5=550 usable characters per strip or 2200 bytes per card. In other fields, as will be discussed later, it may be necessary to express the information in alpha-numeric format, such as with names or descriptions, and in such a case, each character will require 7 bits for definition, and in the alpha-numeric character mode, the total number of available characters is 2,750/7=392 usable alpha-numeric characters per strip. In FIG. 5, those fields which can use a numeric format have their bit count identified with a # sign, while those fields requiring an alpha-numeric format have their bits identified with the @ sign.

Depending upon choice and need, the number of tracks per strip can be modified, and this may involve the use of non-ADA standards in order to accommodate a sufficient quantity of coupons without the requirement of four strips per card.

In FIG. 5, the RETAILER PROCESSING INFORMATION portion 254 has the following fields: RETAILER REIMBURSEMENT AMOUNT 276 (4 bytes); ANNUAL UPDATE CODE 254 (3 bytes); and REQUIRED MERGE LINES 280 (1 byte). The reimbursement amount in field 276 is the retailer's reimbursement expressed in cents. Field 254 is the annual (or possibly every two year) update code for establishing a renewal deadline date. The current date must be prior to this date for the coupons on the user's magcard to be valid. The first of the three bytes represents the first, second, third, or fourth quarter of a year, and the second and third bytes represents the cut-off year (e.g. 92=1992). Field 280, INFO CODE, is reserved for use by the subscription service company and comprises one numeric byte. It may be used by the service company to gather information about the marketing of the product or about the customer household more intelligently. For example, a "0" in the field might indicate that the advertiser is not interested in household information, but rather quantities and geographical marketing data. A "1" may indicate that an advertiser wishes to receive a report from the subscription service organized by consumer zip code. A "2" could indicate the desire on the part of the advertiser to know the age grouping in the household that purchased the product. Thus, the advertiser has an opportunity to insert a code in the message being transmitted (and to change it periodically) which automatically will be understood and acted upon by the subscription service company to give instant marketing results to the advertisers in exactly the way the advertisers want it.

The SECURED SUBSCRIPTION SERVICE 256 portion of the message 250 is broken down into the following fields: SOURCE: PUBLICATION/BROADCAST LOG 282 (11 bytes); HOUSEHOLD NAME 285 (15 bytes); ADDRESS 286 (20 bytes); and ZIP CODE 288 (5 bytes). To increase the number of coupons on a magcard, the last three fields can be expressed in a "Customer I.D. Number" of 9 numerical bytes instead of the 40 bytes indicated.

An approximation of the number of coupons that can be recorded on a single magcard, using the numbers noted in FIG. 5 and assuming a household 9 byte code, a total of 50 bytes (all numeric) per coupon results in 43 coupons plus one household field per card.

Future expansion of the system will involve the immediate use of a consumer's credit card at the retail outlet at which the credit card information will be also be a part of the information recorded on the electronic card carrying the electronic coupons.

Figure 6:
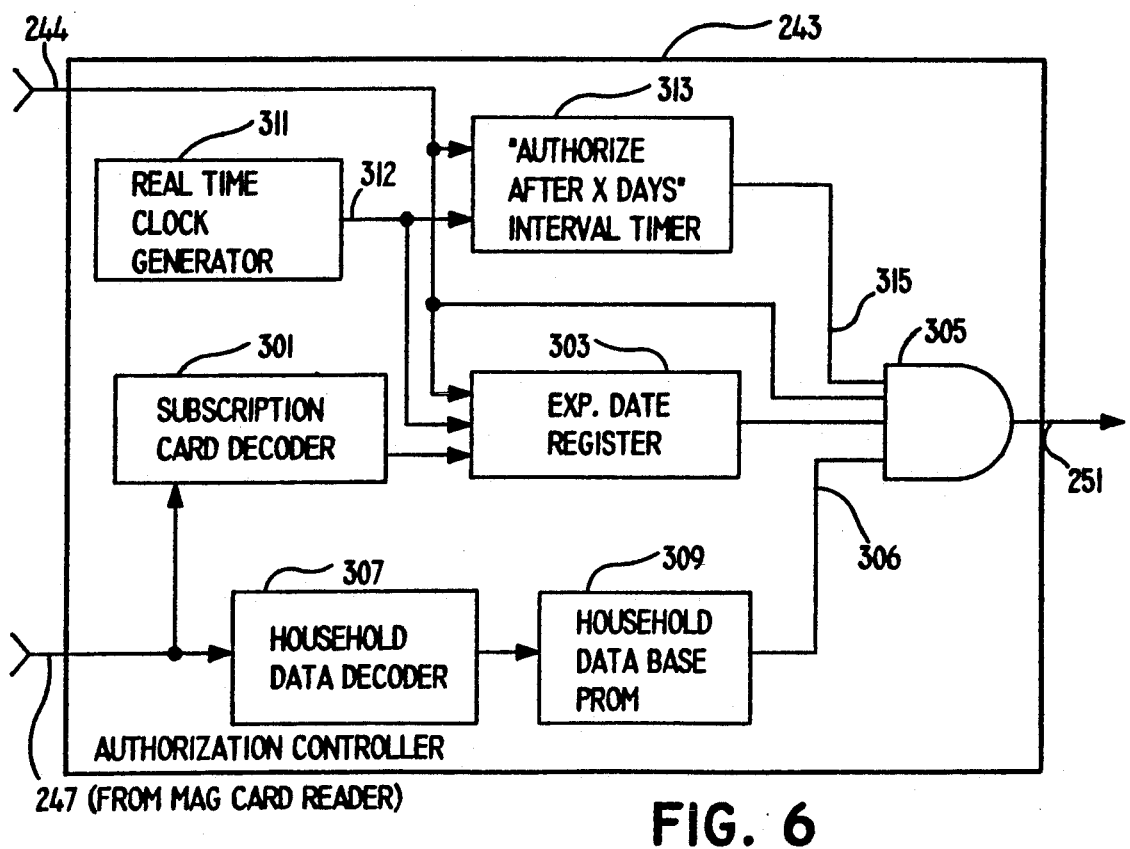
FIG. 6 is a more detailed block diagram of the authorization controller shown in FIG. 4.

Referring to FIG. 6, as previously indicated, there are certain restrictions on the use of electronic coupons. Authorization controller 243 thus monitors all messages intended to be stored on the user's magcard, i.e. the assembled messages on line 244, and selectively passes this data through AND gate 305 if the other inputs to AND gate 305 are logical "1"s. In FIG. 6, there are two functional blocks which would turn off gate 305 if certain conditions are not met. Interval timer 313 is configured to output a logical 1 on line 315 if an electronic coupon is intended to be used only once and then again only after the passage of a predetermined time interval. That function is discussed in connection with FIG. 7.

Contained within the electronic coupon message is an expiration date register 303 which decodes the 6 byte section 270 from the retail purchase information 252 in the character string comprising the electronic coupon message. Register 303 thus is simply a comparator comparing the expiration date of the electronic coupon to be recorded on the user's magcard with the real time on line 312 from an internal real time clock generator 311. If the expiration date has not yet passed, the output of register 303 will be a logical 1. Otherwise, it is a logical 0 and turns off date 305 to restrict passage of the message attempting to be passed to data driver 305 from the message assembler 231.

It is to be understood that the use of a real time clock and expressing dates as days/months/years is a logical and direct way of dealing with expiration dates and the like. However, this may require the user to set a real time clock, which is a nuisance, and requires six bytes of valuable coupon message content. To eliminate these concerns, a modification of the circuitry of FIGS. 6 and 7 (not shown) by rather routine measures can use a 2-digit expiration date code representing the number of weeks the coupon would be valid. This "incremental" manner of expressing time will automatically eliminate the need for a real time clock.

As previously discussed, in order to be authorized to use the electronic coupon system of this invention it is anticipated that the user will, beneficially, be required to cooperate with a subscription service, and in such a case, two additional needs of the system require attention. First, a subscription data card will be issued to each viewer/user and contains, already recorded on the card, household information which was taken from an information sheet prepared by the viewer/user when applying for the subscription. The subscription card (not shown) is read into the system by wiping it through slot 7 of the magcard reader 133 (FIG. 4), and the data reaches authorization controller 243 via line 247. The information read into controller 243 from the subscription magcard includes household date information, i.e. data bytes comprising the secured subscription service portion 256 of the electronic coupon message 250, and expiration date information from data field 270. The former is detected and decoded in decoder 307 which then updates the household data base programmable read only memory PROM 309. This household information on line 306 will be combined, in AND gate 305, with the electronic coupon information on line 244 if AND gate 305 is enabled at its other outputs. The updated household data base includes the new subscription expiration date which is inserted in field 254 when the user downloads electronic coupons to a magcard. In this way, the retailer can verify the fact that a user is an updated and valid subscriber.

Upon receiving a new subscription magcard extending the user's subscription service through another annual period (or other convenient time period), subscription card decoder 301 decodes a new "VALID UNTIL" date from the subscription magcard and updates the expiration date register 303. Register 303 thus has two functions, it compares the real time clock on line 312 with both the expiration date bytes 270 in the electronic coupon message and also makes a similar comparison with the "VALID UNTIL" date read in by the subscription magcard. For so long as the subscription is valid and the expiration date of the electronic coupon has not yet passed, gate 305 will be enabled to pass the electronic coupon information from line 244 and the household identification information on line 306 to its output 351. Expiration date register 303 is implemented primarily by a pair of logic comparators commonly used in the art.

Figure 7:
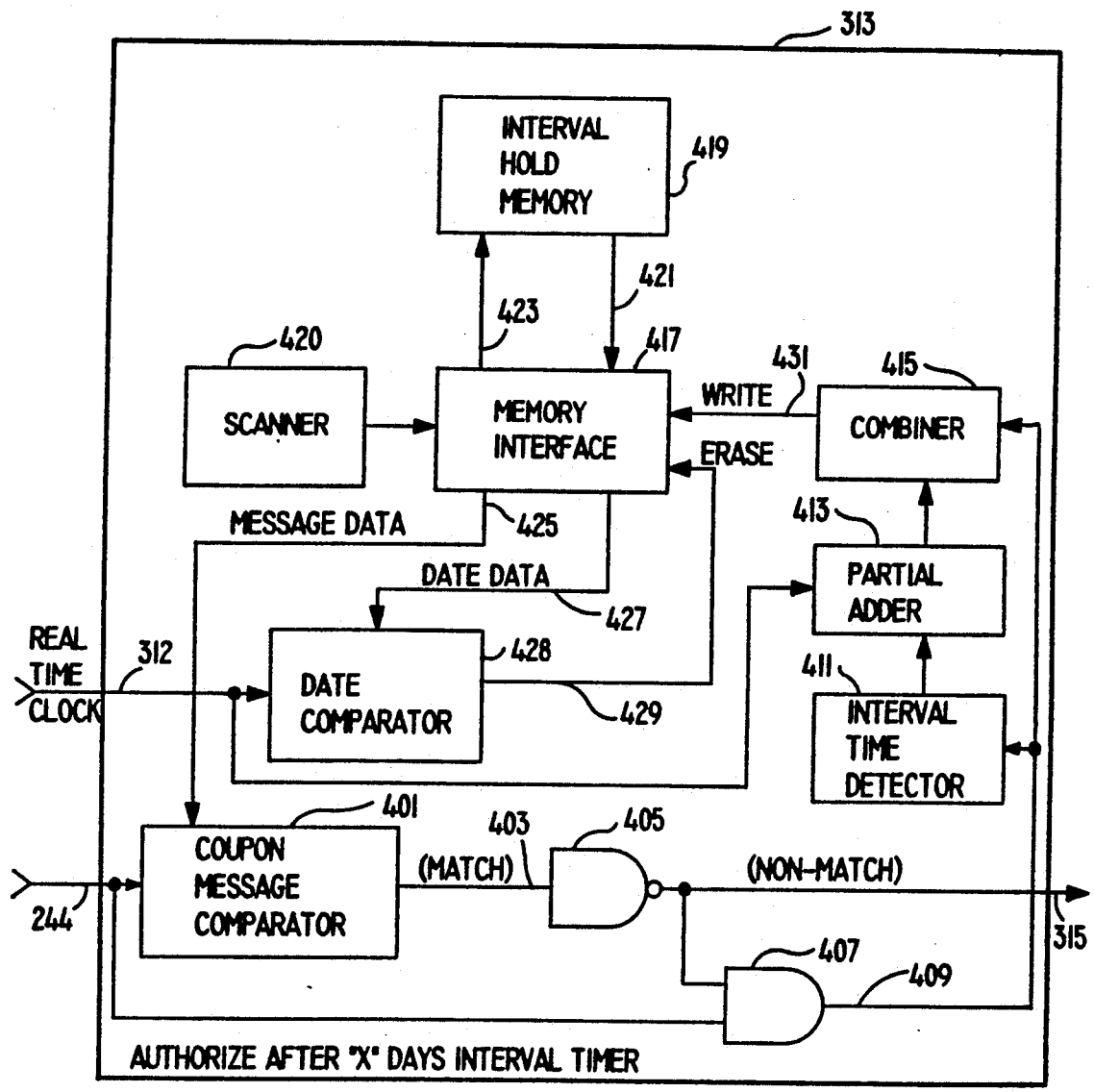
FIG. 7 is a detailed block diagram of the "authorized after X days" interval timer of FIG. 6.

The operation of the "AUTHORIZE AFTER X-DAYS" interval timer 313 will now be discussed in conjunction with FIG. 7. It is the function of this block to monitor the "validity time interval" bytes 272 of the retail coupon purchase information portion 252 of the electronic coupon message 250. The time interval concerned is that time beyond which the manufacturer authorizes a repeated use of an electronic coupon. Thus, the first time a user selects an electronic coupon to be recorded on the user's magcard, it will be recorded, and simultaneously a date, equal to the time interval indicated in field 272, will be added to the current real time and stored in an internal memory 419 of interval timer 313. Any attempt to use the electronic coupon before the interval time has passed will result an output on line 315 which presents a logical 0 to AND gate 305 preventing that particular electronic coupon from being recorded on the user's magcard.

The assembled messages are inputted to interval timer 313 overlying 244 and routed to one input of AND gate 407 and to coupon message comparator 401. Interval hold memory 419 contains all stored electronic coupons having a timed interval restriction. Since the first time an electronic coupon is to be used, memory 419 does not contain that electronic coupon in its memory, the memory interface 417 being scanned by scanner 420 does not contain an equivalent electronic coupon message on line 425 to be compared in comparator 401. Thus, there would be no match in the two electronic coupon messages, and line 403 would be a logical 0. This control signal on line 403 is inverted in NAND gate 405 to produce a logical 1 on line 315 enabling the electronic coupon to pass through AND gate 305 in FIG. 6 and be recorded on user's magcard.

Simultaneously, the logical 1 at the output of gate 405 enables AND gate 407 which passes the electronic coupon message over line 409 to a combiner 415 and an interval time detector 411. Detector 411 strips from the electronic coupon message the validity time interval bytes in field 272 (e.g. representing a 6 month interval) and sends that data to partial adder 413. The real time clock on line 312 is also sent to adder 413, so that the output is a time equal to the current time plus the interval time (in this example, 6 months). The electronic coupon signal from line 409 is thus combined with the new advanced time (current time plus 6 months) in combiner 415 and is sent to memory interface 417 over line 431 to be written into memory 419 over line 423 in a conventional manner. From this point forward, as scanner 420 scans through the contents of memory 419 by means of the memory interface 417 continually retrieving memory data over line 421 and outputting the same over line 425, the next time the same electronic coupon message is received on line 244, a comparison is positive in comparator 401, and line 403 becomes a logical 1 and line 315 becomes a logical 0, turning off the AND gate 305 (FIG. 6) and preventing the message from being recorded onto the user's magcard. This condition will continue until the time interval has passed i.e. until the date in the electronic coupon stored in memory 419 becomes less than the real time date on line 312. A date comparator 428 thus receives just the date field from the messages being scanned through interface 417 on line 427. When the real time date exceeds the date stored in the electronic coupon in memory 419, comparator 428 outputs a logical 1 on line 429 which is sent to memory interface 417 so as to erase the contents of memory 419 for that particular electronic coupon. Thus, when the user attempts to again use the coupon and the restricted time interval has passed, comparator 401 will not find a comparison, and the system operates as if the message were received for the first time as previously discussed.

The limit code byte in field 274 (FIG. 5) in the retail coupon purchase information section 252 operates in a manner similar to that just described with respect to the interval timer. That is, instead of comparing dates and updating dates within the interval timer 313, a quantity comparator and quantity update function is carried out in a similar functional block (not shown). For example, upon first usage, there is no limit involved, and the output (corresponding to line 315) will be a logical 1 enabling recording of the electronic coupon on the user's magcard. Simultaneously, a counter is set to the number in the limit code field 274, and the comparison at a comparator (similar to that of comparator 401) will again pass the electronic coupon to the magcard until such time as the counter reaches 0, at which time a comparison will be sensed, and the output of the limit code detector will inhibit further recording of the electronic coupon on the user's magcard.

It should be noted that the electronic coupon information being transmitted by the TV station includes an alpha-numeric description of the product and discount amount to be displayed on the TV screen. This alpha-numeric information is stored in memory 128 along with other information fields (FIG. 5) and is also available to the user in the edit mode. However, when recorded on the magcard for redemption, only the fields discussed in connection with FIG. 5 are transferred to the card, since such alpha-numeric descriptive data is not needed by the redemption center.

Figure 8:
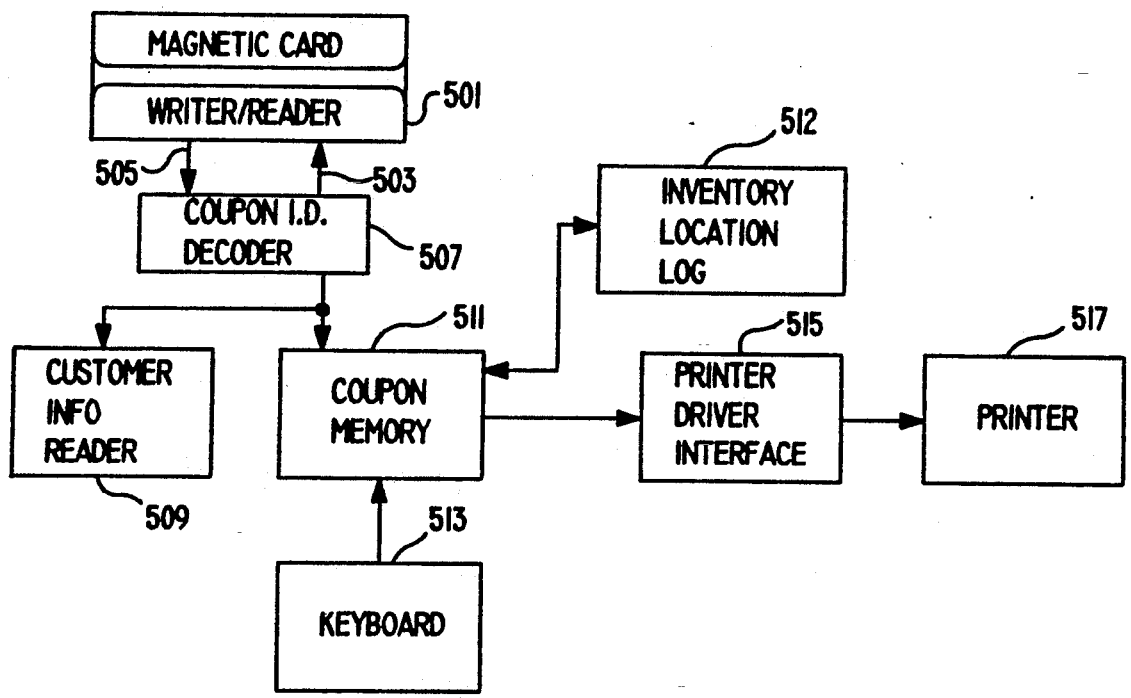
FIG. 8 is one arrangement of the apparatus in a redemption center for receiving and manipulating data from redeemed electronic coupons.

The redeeming of the coupon at the redemption center (e.g. retail store) can be implemented in a number of ways. FIG. 8 shows one way. A user will enter the retail store and find the coupon redemption desk upon which a magnetic card writer/reader is conveniently located. A user wipes his or her magcard through the slot of writer/reader 501, and the information is interpreted by coupon ID decoder 507 and sent to a customer information reader 509 and coupon memory 511. The information sent to reader 509 records significant information from the magcard, such as the user's name, address, zip code, product being purchased, limit on number of purchases per visit, etc. This information can later be used by the retail outlet or the manufacturer to intelligently make adjustments to its marketing efforts. The limit on purchases is obtained from the LIMIT CODE field 274 (FIG. 5) in the coupon message, as an alternate use for field 274 discussed earlier. The coupon memory will contain information inputted by a modem or floppy disk from the manufacturer, and/or through a keyboard 518 by an operator of the retail establishment so that a comparison can be made with the information being decoded from the user's magcard. When a match is made, the printer driver interface 515 sends the electronic coupon information to a printer 517 which may print a hard copy of the electronic coupon containing not only the product and discount information but also directions as to which aisle or other location in the store the product can be found, and, optionally, dependent upon application, a bar code for use at the cash register.

Figure 9:
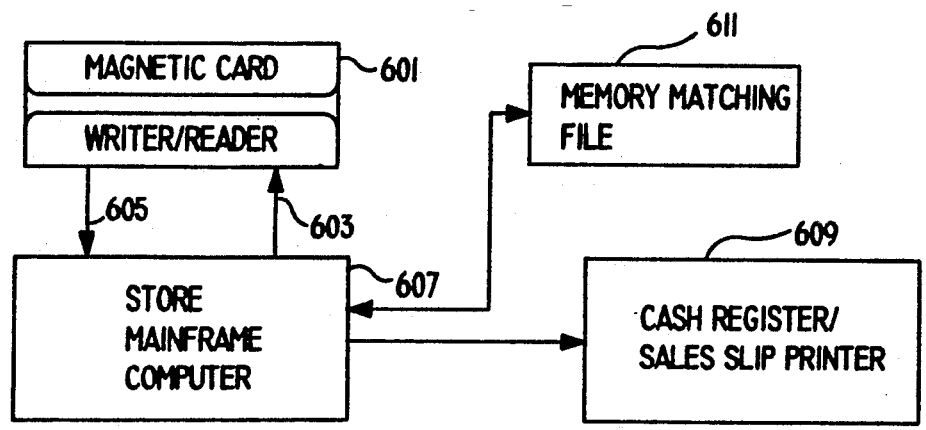
FIG. 9 illustrates a basic arrangement for crediting electronic coupon discounts directly on the sales slip of a cash register at a redemption center.

FIG. 9 indicates that, instead of a dedicated stand-alone retail store unit, the magcard writer/reader 601 can be interfaced with the retail's mainframe computer 607 via write and read lines 603 and 605, respectively. Writer/reader 601 may be of the type which draws a users card in and holds it in the machine until the transaction is completed. The card is then released Additionally, as explained earlier, a cash register/sales slip printer 609 can be configured to receive (via the computer 607) the user's magcard data directly without having to print a paper coupon to be read by an optical scanner which would slow down the checkout process. However, even if the electronic coupon is to be redeemed by the user by sliding his or her card through a magcard reader at the cash register, with the amount automatically being deducted from the products being rung up by the cashier, it is still a convenience to the customer for the store to provide an electronic coupon convenience desk at a readily accessible location near the entrance to the store, so that the user can wipe the card through the slot of the reader and obtain valuable information as to the availability of the product and its location in the store. The two systems can operate totally compatible with one another or independently. In either case, the entire process through checkout is much more streamlined over the clumsy, complex and time-consuming manual process of redeeming cut-out coupons in existence today.

Since the user may want to redeem some coupons and not others recorded on the card, a memory matching file 611 is provided which receives all of the electronic coupons from the user's card at the beginning of checkout At the end of checkout, all of the products for which electronic coupons existed on the card are compared with the full list in memory matching file 611, and any unused coupons will automatically be written back to the card.

It will be appreciated that, although the invention has been described on the basis of preferred embodiments of the invention, variations of the invention will become obvious to one skilled in the art having been exposed to the invention by the description of the preferred embodiments. For example, the same concepts as disclosed herein remain the same whether analog or digital signals are employed. Additionally, all of the timing and coordinating of functions within the encoder and decoder units can be carried out by operation of a microprocessor with only simple programming required to implement the invention. Accordingly, the invention is not to be limited by this description, but only by the scope of the appended claims.

I claim:

1. An apparatus for decoding and storing messages encoded in the signal of a television picture transmission, said television picture transmission containing video, audio, and message components, the video component of said television picture transmission being displayed as a picture on a video screen, said apparatus comprising:

decoding means for receiving said message component, and for decoding said encoded messages contained therein to produce a message signal containing said messages;

a logo generator for generating a logo signal to create a visible logo on the display of a video screen, said logo generator synchronized with said video component of said television picture transmission signal;

a video mixer receiving said video component of said television picture transmission signal, and receiving output from said logo generator for mixing said logo signal with said video component so as to superimpose said logo on said picture as viewed on the video screen;

means coupled to said decoding means for sensing the existence of a message signal, and enabling the coupling of said logo signal to said video mixer only during the time a message exists;

means coupled to the output of said decoding means for passing selected ones of said message signals to said video mixer for mixing said message signal with said video component so as to superimpose said selected message on said video component as viewed on the video screen;

storage means capable of storing at least a part of each message selected;

means for manually selecting ones of said displayed messages for storage in said storage means; and means for storing said selected message in said storage means.

2. The apparatus as claimed in claim 1, wherein said storage means comprises a memory.

3. The apparatus as claimed in claim 1, wherein said storage means is selected from the group consisting of magnetic cards, optical storage cards, and microchip cards, and their associated writing devices.

4. The apparatus as claimed in claim 1, wherein said storage means comprises a printer and hard printout.

5. The apparatus as claimed in claim 1, wherein said at least a part of each message selected is a code representing a discount toward the purchase of an item being displayed on the video screen during the time said selected message was displayed.

6. The apparatus as claimed in claim 2, further comprising:
means coupled to said memory for retrieving messages stored in said memory; and
a storage card writer and storage card, said storage card writer coupled to said means for retrieving messages for writing at least portion of said messages onto said storage card.

7. The apparatus as claimed in claim 6, comprising a message editor including:
means coupled to said memory for reviewing all of said messages stored in said memory; and
means for selectively deleting undesirable ones of said stored messages before said storage card writer writes said retrieved messages onto said storage card.

8. The apparatus as claimed in claim 2, further comprising:
means coupled to said memory for retrieving messages stored in said memory; and
a printer and hard printout, said printer coupled to said means for retrieving messages for printing at least a part of said message onto said hard printout.

9. The apparatus as claimed in claim 6, comprising a message editor including:
means coupled to said memory for reviewing all of said messages stored in said memory; and
means for selectively deleting undesirable ones of said stored messages before said printer prints said retrieved messages on said hard printout.

10. An electronic redeemable coupon generating system comprising:
encoding means for encoding coupon-related data as part of the information contained in a standard television signal transmission, said transmission including picture information, associated with said coupon-related data, for display on a television monitor screen;
decoding means for receiving said standard television signal transmission and for extracting said coupon-related data from said standard television signal transmission during display of said associated picture information;
means for selecting portions of the extracted coupon-related data and generating representations of such selected portions; and
recording means for recording said representations of said extracted coupon-related data portions on a recording medium for subsequent readout and coupon redemption.

11. The system as claimed in claim 10, wherein said decoding means comprises means for displaying indicia on a television monitor screen responsive to coupon-related data being encoded in said television signal transmission.

12. The system as claimed in claim 10, wherein said decoding means comprises user means, manually operated by a person using said decoding means, for selectively enabling and disabling extraction of said coupon-related data from said television signal transmission by said means for extracting.

13. The system as claimed in claim 12, wherein said decoding means comprises:
memory means for accumulating selectively extracted coupon-related data; and wherein said recording means includes
means for storing representations of portions of said selectively extracted coupon-related data on said recording medium.

14. The system as claimed in claim 13, wherein said decoding means comprises means for editing the contents of said memory means.

15. The system as claimed in claim 10, wherein said medium is selected from the group consisting of magnetically striped cards, optical storage cards, and microchip cards, and said recording means is a writing device for writing information on said medium.

16. A decoding unit for receiving a standard television signal transmission containing picture information for display on a television monitor screen, and further containing associated coupon-related data encoded as part of the information contained in said standard television signal transmission, said decoding unit comprising:
means for extracting said coupon-related data from said standard television signal transmission during display of said associated picture information; and
recording means for recording representations of selected portions of extracted coupon-related data on a recording medium for subsequent readout and coupon redemption.

17. The decoding unit claimed in claim 16, comprising means for displaying predefined indicia on the television monitor screen responsive to coupon-related data being encoded in said television signal transmission.

18. The decoding unit as claimed in claim 17, comprising user means, manually operated by a person using said decoding means for selectively enabling and disabling extraction of said coupon-related data from said television signal transmission by said means for extracting.

19. The decoding unit as claimed in claim 18, comprising:
memory means for accumulating selectively extracted coupon-related data; and wherein
said recording means is coupled to said accumulating means for storing representations of portions of said selectively extracted coupon-related data on said recording medium.

20. The decoding unit as claimed in claim 19, comprising: means for editing the contents of said memory means.

21. The decoding unit as claimed in claim 16, wherein said medium is selected from the group consisting of magnetically striped cards, optical storage cards, and microchip cards, and said recording means is a writing device for writing information on said medium.

22. The decoding unit as claimed in claim 20, comprising authorization means for preventing storage of selected coupon-related data on said recording medium by said means for storing upon detection of a passed expiration date code contained in said coupon-related data.

23. The decoding unit as claimed in claim 20, comprising authorization means for preventing storage of selected coupon-related data on said recording medium by said means for storing upon detection of a time interval having passed relative to the time said selected coupon-related data was previously stored on said recording medium.

24. The decoding unit as claimed in claim 20, comprising authorization means including:
means for storing a user subscription validation date code; and
means for preventing storage of selected coupon-related data on said recording medium by said means for storing upon detection of the expiration of said user subscription validation date code.

25. The decoding unit as claimed in claim 20, comprising authorization means for preventing storage of selected coupon-related data on said recording medium by said means for storing upon detection of the number of times said selected coupon-related data is stored on said recording medium exceeding a limit code contained in said selected coupon-related data.

26. An apparatus for decoding and storing messages encoded in the signal of a television picture transmission, said television picture transmission containing video, audio, and message components, said message component being transmitted periodically, the video component of said television picture transmission being displayed as a picture on a video screen and including a visible logo in the picture area only when a message component is being transmitted, said apparatus comprising:
decoding means for receiving said message component, and for decoding said encoded messages contained therein to produce a message signal containing said messages;
a video mixer receiving said video component of said television picture transmission signal;
means coupled to the output of said decoding means for passing selected ones of said message signals to said video mixer for mixing said message signal with said video component so as to superimpose said selected message on said video component as viewed on the video screen;
storage means capable of storing at least a part of each message selected;
means for manually selecting ones of said displayed messages for storage in said storage means; and
means for storing said selected message in said storage means.

27. The apparatus as claimed in claim 26, including means, responsive to said means for storing functioning to store a selected message in said storage means, for altering an attribute of said logo in order to give a visual indication of a successful message selection and storage.

28. A decoding unit for receiving a broadcasted standard television signal containing picture information for display on a television monitor screen, and further containing coupon-related data encoded as part of the information contained in said standard television signal, said decoding unit comprising:
means for extracting said coupon-related data from said standard television signal; and
recording means for recording representations of selected portions of extracted coupon-related data on a recording medium for subsequent readout and coupon redemption.

29. The decoding unit claimed in claim 28, comprising means for displaying predefined indicia on the television monitor screen responsive to coupon-related data being encoded in said television signal transmission.

30. The decoding unit as claimed in claim 29, comprising user means, manually operated by a person using said decoding means for selectively enabling and disabling extraction of said coupon-related data from said television signal transmission by said means for extracting.

31. The decoding unit as claimed in claim 30, comprising:
memory means for accumulating selectively extracted coupon-related data; and wherein
said recording means is coupled to said accumulating means for storing representations of portions of said selectively extracted coupon-related data on said recording medium.

32. The decoding unit as claimed in claim 31, comprising:
means for editing the contents of said memory means.

33. The decoding unit as claimed in claim 29, wherein said predefined indicia is a logo which is displayed when said means for extracting detects that coupon-related data is encoded in the standard television signal.

34. The decoding unit as claimed in claim 28, wherein said means for extracting includes pulse detecting means and pulse decoding means for detecting and decoding coupon-related data which has been pulse encoded within the vertical blanking interval of the standard television signal.

35. The decoding unit as claimed in claim 34, wherein said pulse detecting means detects pulse coded information contained within a horizontal scan line of the vertical blanking interval of the television signal.

36. A decoding unit for receiving a standard television signal containing picture information for display on a television monitor screen, and further containing coupon-related data encoded as part of the information contained in said standard television signal, said decoding unit comprising:
means for extracting said coupon-related data from said standard television signal;
recording means for recording representations of selected portions of extracted coupon-related data on a recording medium for subsequent readout and coupon redemption; and
means for displaying predefined indicia on the television monitor screen responsive to coupon-related data being encoded in said television signal transmission.

37. The decoding unit as claimed in claim 28, wherein:
the coupon-related data contained in said broadcasted standard television signal includes broadcast source log information; and
said recording means records a representation of said broadcast source log information on said recording medium.

* * * * *